Patented June 15, 1937

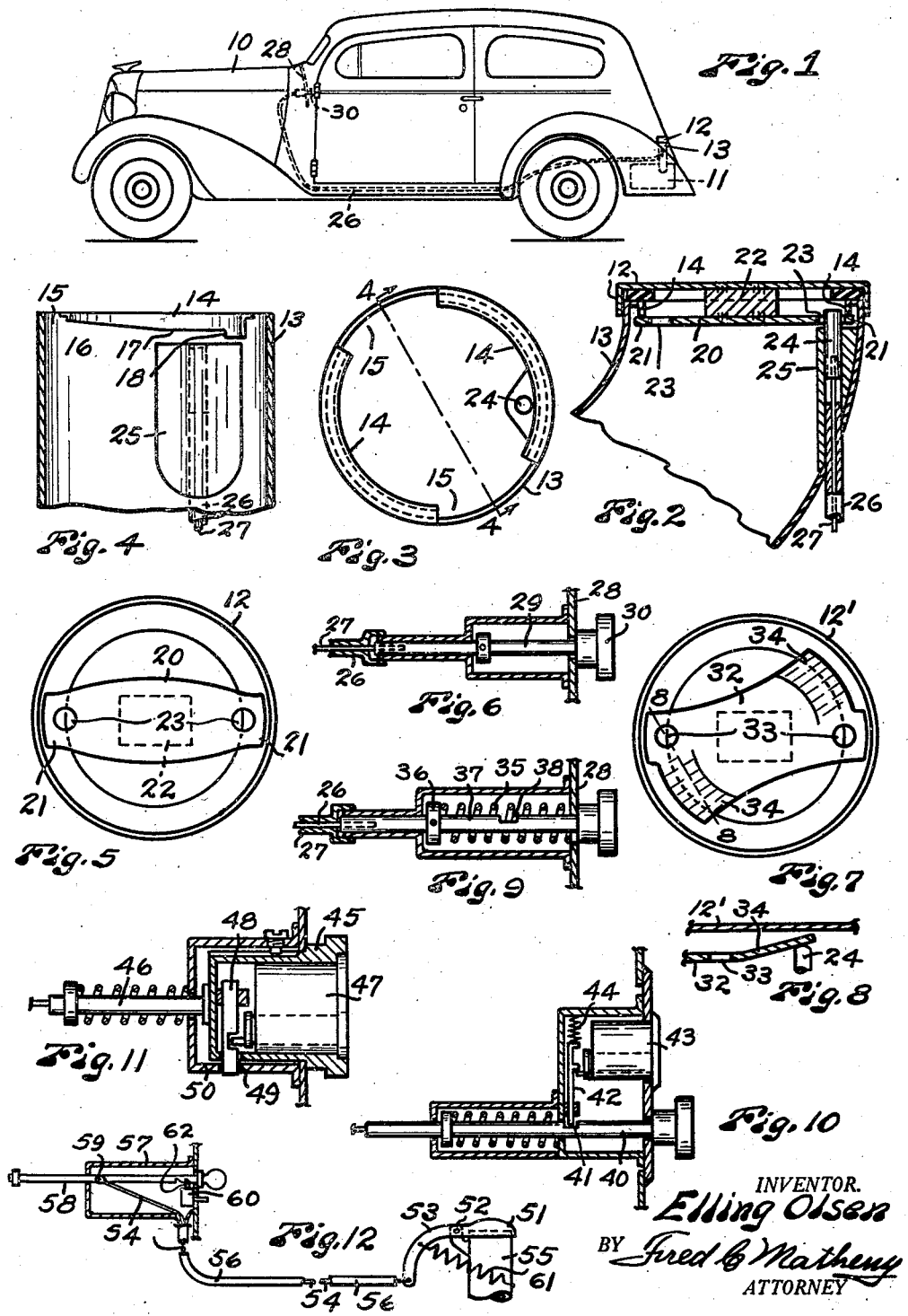

2,084,045

UNITED STATES PATENT OFFICE 2,084,045

LOCK MEANS FOR GASOLINE TANK CAPS

Elling Olsen, Seattle, Wash.

Application February 24, 1936, Serial No. 65,301

3 Claims. (Cl. 220—55)

My invention relates to lock means for the caps of gasoline tanks of motor vehicles and a primary object of my invention is to provide means for preventing theft of gasoline from the gasoline tanks of motor vehicles by rendering it impossible for unauthorized persons to remove the caps which control access to said gasoline tanks.

Another object is to provide gasoline tank cap locking means controlled from the interior of a fully enclosed body or cab of a motor vehicle for selectively locking or releasing the cap on the gasoline tank of said motor vehicle, the control means of said cap locking means being inaccessible when the doors of the vehicle body are closed and locked, except to persons having the proper keys for unlocking said doors.

A further object of this invention is to provide gasoline tank cap locking means of this type having independent lock mechanism connected therewith, thus rendering said cap locking means fully effective irrespective of all other locking means on the vehicle.

Other objects of the invention are to provide gasoline tank cap locking means of this nature which is simple in construction, inexpensive to manufacture, efficient in operation and which may be applied to the usual motor vehicle with very little alteration of the standard motor vehicle parts.

It is relatively easy to withdraw gasoline from the gasoline tank of a motor vehicle by removing the cap from said tank, inserting a rubber tube into the tank and siphoning off the gasoline. Gasoline is frequently stolen in this way from the tank of parked motor vehicles. It is an object of this invention to provide means by which the driver or owner of a motor vehicle may lock the gasoline tank cap against removal and as quickly unlock the same without leaving his seat in the vehicle.

Other and more specific objects of this invention will be apparent from the following description taken in connection with the accompanying drawing.

In the drawing Figure 1 is a somewhat diagrammatic view on a small scale of gasoline tank latch means constructed in accordance with my invention showing the same installed on a motor vehicle.

Fig. 2 is a fragmentary sectional view on a larger scale of a portion of the filler tube showing the cap locked onto the same.

Fig. 3 is a plan view of the filler tube with the cap removed.

Fig. 4 is a fragmentary sectional view of the filler tube with the cap removed and parts shown in elevation.

Fig. 5 is a detached inverted plan view showing the inner side of the cap.

Fig. 6 is a fragmentary sectional view of the operating means connected with the instrument board.

Fig. 7 is a detached inverted plan view of a modified form of gasoline tank cap.

Fig. 8 is a sectional view substantially on broken line 8—8 of Fig. 7.

Fig. 9 is a fragmentary sectional view, with parts in elevation, of the operating means on the instrument board which is used in connection with the lock shown in Figs. 7 and 8.

Fig. 10 is a fragmentary sectional view with parts in elevation showing an independent primary lock mechanism installed in connection with my gasoline tank cap locking means.

Fig. 11 is a view similar to Fig. 10, showing a different adaptation of the primary lock mechanism.

Fig. 12 is a fragmentary sectional view showing a modified form of gasoline tank cap adapted to be opened and by the driver without requiring the driver to get out of the vehicle.

Like reference numerals designate like parts throughout the several views.

Referring to Figs. 1 to 6 of the drawing, 10 designates a motor vehicle having a body of the closed type provided with doors which may be locked in a closed position, in the usual manner to prevent persons without keys from obtaining access to the interior of said body. 11 designates a gasoline tank at the rear of said motor vehicle and 12 designates a cap provided on a filler tube 13 which is connected with the gasoline tank 11. The upper end of the filler tube 13 is provided with two oppositely positioned inwardly extending flanges 14, Figs. 3 and 4, each preferably extending less than one half of the distance around the tube 13 leaving spaces 15 between the adjacent ends thereof. The under side of each flange 14 preferably has an inclined portion 16 adjacent one end and has a flattened portion 17 connecting with the inclined portion 16 and has a stop member 18 adjacent the other end. The cap 12 is internally provided with a fixedly secured bar member 20 spaced from the top of the cap and having end portions 21 terminating slightly short of the peripheral wall of the cap. The end portions 21 of the bar member 20 pass downwardly through the spaces between the ends of the flanges 14 when the cap is applied to the mouth of the filler tube and said end portions then pass under the flanges 14 when the cap is moved angularly and are finally engaged with the stop shoulders 18. Preferably the bar 20 is sufficiently resilient to hold the cap snugly in contact with the end of the tube 13 when the end portions 21 of said bar 20 rest on the flattened sections 17 of the flanges 14. The bar member 20 is fixedly secured to the cap in any desired manner, as for instance by a spacer member 22, Fig. 2, which may be welded to the bar member 20 and to the top of the cap 12.

All of the parts above described conform generally to the construction of like parts now in common use.

This invention resides in the provision of latch means for locking the cap 12 onto the top of the tube 13 and in the provision of devices for operating and controlling this latch means.

In accordance with this invention I provide two latch receiving recesses or openings 23 in the respective end portions 21 of the bar member 20. A latch bolt 24 is slidable in a suitable guide member 25 in the filler tube 13 and is positioned so that it will be in alignment with one of the latch receiving recesses 23 when the cap 12 is placed on the filler tube 13 and turned so as to position the end portions 21 of the bar member 20 against the stop shoulders 18. The filler tube 13 is usually of elbow shape, as shown, and a tubular metal conduit 26 as a pipe or flexible metal tube is connected with the curved wall of the filler tube 13 in alignment with the latch bolt 24. A latch bolt operating wire 27 disposed within the conduit 26 is connected with the latch bolt 24. The conduit 26 and wire 27 extend in any suitable manner, preferably to the instrument board 28 of the motor vehicle 10. The conduit 26 is preferably connected with a housing 26' which is secured to the instrument board 28 and the latch operating wire 27 is connected with a reciprocably mounted rod 29. Knob means 30 on the rod 29 may be grasped for longitudinally moving said rod. The conduit 26 with the wire 27 therein extends from the instrument board 28 to the filler tube 13 through a part of the motor vehicle or motor vehicle body which protects and hides said conduit and makes it difficult of access and the conduit 26 is preferably connected with a protected and unexposed portion of the filler tube making it difficult to get at the wire 27 for the purpose of tampering with the same. The latch bolt 24 is within the filler tube 13 and is not accessible. The knob 30 is positioned within the closed portion of the motor vehicle body and can not be reached when the doors of the motor vehicle body are closed and locked.

The operation of the device shown in Figs. 1 to 6 is as follows: When the cap 12 is on the tube 13 and the latch bolt 24 is in one of the recesses 23 said cap 12 is locked against angular movement and can not be removed. When the cap 12 is thus locked the knob 30 will be positioned close to the instrument board 28. To permit removal of the cap 12 for the purpose of taking gasoline, the driver grasps the knob 30 and pulls the rod 29 outwardly. This longitudinally moves the wire 27 to retract the bolt 24 and release the cap 12. After the cap 12 has been properly replaced on the filler tube 13 the driver pushes the knob 30 inwardly thus projecting the bolt 24 into one of the recesses 23 and again locking the cap.

In Figs. 7, 8 and 9, I have shown a snap latch means for locking a cap onto a filler tube. This means is similar to the mechanism shown in Figs. 1 to 6, except that a cap 12' is provided with a modified form of bar member 32 having two recesses 33 for receiving the latch bolt 24 and having inclined surfaces 34 approaching said recesses 33 whereby when the latch bolt is in its locking position and the cap 12' is not on the filler tube 13 said cap may be applied to the filler tube and turned into latched position. As the cap 12' is turned toward the latched position, in applying the cap, one of the inclined surfaces 34 will engage with the end of the latch bolt 24 and press the latch bolt downwardly until the latch bolt registers with one of the recesses 33 and snaps into said recess. The means for snapping the latch bolt 24 into the recess 33 preferably is in the nature of a compression spring 35 interposed between the instrument board 28 and a collar 36 on an operating rod 37 which is connected with the latch bolt operating wire 27. Preferably means are provided for holding the operating rod 37 retracted. This may be in the form of a notch 38 in the operating rod adapted to engage with the instrument board 28. The operation of this snap latch device is similar to the operation of the previously described device except that when the cap 12' is properly replaced on the filler tube 13 the latch bolt 24 will always snap into locked position, provided, of course, that the operating rod 37 is not held in retracted position by engagement of the notch 38 with the instrument board 28. If the bolt 24 is being held in retracted position, as above described, when the cap is applied, then said bolt will snap into locked position as soon as the operating rod 37 is released.

In both types of the invention hereinbefore described the cap of the gasoline tank is securely locked against removal by latch means which is controlled from within the body of the motor vehicle and in both instances the control means is inaccessible when the doors of the motor vehicle body are closed and locked.

If it is desired to adapt this cap locking mechanism to vehicles of the open body type or to any vehicles where the usual vehicle locking means will not preclude access to the control means for retracting the bolt 24, namely, the knob and rod which are connected with the bolt retracting wire 27, then the control means for retracting the bolt may be locked by an independent lock connected therewith. Figs. 10 and 11 disclose two different locking means of this nature.

In Fig. 10, I show a bolt operating rod 40 having a notch 41 therein for the reception of a bolt 42 which is connected with a primary lock mechanism 43. A spring 44 normally urges the bolt 42 into locked position and will always tend to snap the bolt 42 into the notch 41 unless said bolt 42 is held retracted by the lock 43. With this type of lock it is necessary to use the proper key in primary lock mechanism 43 and retract the bolt 42 before the operating rod 40 can be moved to unlock the gasoline tank cap.

In Fig. 11, I show a longitudinally movable receptacle 45 constituting a knob member and having an operating rod 46 secured thereto. A primary lock mechanism 47 is provided in the receptacle 45. A bolt 48 operated by the use of a key in the primary lock 47 is adapted to lock into or be withdrawn from a recess 49 in a fixed housing 50 to selectively lock the receptacle 45 and operating rod 46 against longitudinal movement or to permit movement of the same.

It will be noted that the bolt 42 of Fig. 10 is a snap latch type while the bolt 48 of Fig. 11 is a dead bolt type.

In Fig. 12 I show by a somewhat diagrammatic view, a gasoline tank cap and operating means for the same which is movable into an open position by means operated by the driver while in the driver's seat and which is movable into a closed position, when released, by a spring. In Fig. 12 numeral 55 designates a filler tube. 51 is a cap for said tube. 52 is a pivotal mounting for the cap. 53 is a lever connected with the cap and 54 is a push and pull wire or rod connected with the lever 53 and extending through a conduit 56 to a location forward of the motor vehicle where it may be connected with control mechanism positioned for convenient operation from the driver's seat. Preferably the wire 54 extends into a housing 57 on the instrument board and is connected by pivot means 59 with an operating rod 58. The operating rod 58 is locked in the position shown in Fig. 12 by a spring pressed catch member 60 positioned to engage within notches 61 in said rod. The catch member 60 is released by the operator preparatory to retracting the operating rod 58 for the purpose of opening the cap 51. When the operating rod 58 is returned to the position shown in Fig. 12 the catch member 60 snaps into locked position. Preferably a spring is provided for moving the cap 51 to open position. This spring may be connected with the lever 53, as spring 61. If desired a key operated lock may be provided for locking the operating rod 58 in the same manner as the operating rod shown in Fig. 10 is locked.

Several forms of the invention are presented herein by way of exemplification, and it will be understood that the invention is susceptible of embodiments in other structurally modified forms coming equally within the scope of the appended claims.

I claim:

1. The combination with the gasoline tank of a motor vehicle, which gasoline tank has an elbow shaped filler tube provided with a cap, of a horizontal bar member provided within said cap adapted to engage said filler tube, said bar member having bolt receiving recesses; a vertically movable bolt positioned within said filler tube adapted to lock into said recesses of said bar member; guide means for said bolt positioned against the outer curved wall of said elbow shaped filler tube; an operating wire connected with said bolt and extending downwardly through the outer curved side of said elbow shaped filler tube and to a position accessible to a person occupying the driver's seat of the vehicle; a conduit connected with said filler tube and shielding and guiding said operating wire; and a control member connected with the forward end of said operating wire.

2. In gasoline tank cap locking means, an elbow shaped gasoline tank filler tube; an upright bolt guide positioned within said filler tube and against the outer elbow shaped curved wall thereof; a bolt reciprocable in said bolt guide; a guide tube extending upwardly into the side of said filler tube and connected with said bolt guide; a flexible bolt operating wire in said guide tube extending into said bolt guide and connected with said bolt; manually operated control means connected with said bolt operating wire remote from said filler tube; and a tube cap having means positioned for locking engagement by said bolt when said cap is applied to said filler tube.

3. In gasoline tank cap locking means, a gasoline tank filler tube; a bolt guide positioned within said filler tube; a bolt vertically movable in said bolt guide and projecting above said bolt guide when in locking position; a flexible bolt operating wire extending into said filler tube and connected with said bolt guide; manually operated control means connected with said bolt operating wire; spring means urging said bolt into upwardly projected locking position; a cap member for said filler tube; a locking bar secured to the inner side of said cap member, said locking bar having recesses for the reception of said bolt; cap retaining means on the filler tube positioned for engagement by the locking bar in response to angular movement of the cap member on the filler tube; and inclined bolt engaging means operatively connected with said locking bar positioned to engage with and depress said bolt in response to angular movement in one direction of said cap member on said filler tube, whereby said bolt member may be positioned for entrance into a recess in said locking bar.

ELLING OLSEN.